(12) United States Patent
Zhao et al.

(10) Patent No.: US 12,082,524 B2
(45) Date of Patent: Sep. 10, 2024

(54) AUTONOMOUS LAWN MOWER WITH EDGER AND CONTROL METHOD THEREOF

(71) Applicant: Positec Power Tools (Suzhou) Co., Ltd, Jiangsu (CN)

(72) Inventors: Fengli Zhao, Jiangsu (CN); Xiahong Zha, Jiangsu (CN); Xiaoqing Zhou, Jiangsu (CN)

(73) Assignee: Positec Power Tools (Suzhou) Co, Ltd., Suzhou (CN)

( * ) Notice: Subject to any disclaimer, the term of this patent is extended or adjusted under 35 U.S.C. 154(b) by 870 days.

(21) Appl. No.: 17/058,983

(22) PCT Filed: May 30, 2019

(86) PCT No.: PCT/CN2019/089315
§ 371 (c)(1),
(2) Date: Nov. 25, 2020

(87) PCT Pub. No.: WO2019/228461
PCT Pub. Date: Dec. 5, 2019

(65) Prior Publication Data
US 2021/0219488 A1  Jul. 22, 2021

(30) Foreign Application Priority Data

May 30, 2018 (CN) .......................... 201810540754.4
Sep. 12, 2018 (CN) .......................... 201811064195.0

(51) Int. Cl.
*A01D 34/00* (2006.01)
*A01D 34/416* (2006.01)
(Continued)

(52) U.S. Cl.
CPC ......... *A01D 34/008* (2013.01); *A01D 34/416* (2013.01); *A01D 34/64* (2013.01);
(Continued)

(58) Field of Classification Search
CPC .. A01D 34/006; A01D 34/008; A01D 34/416; A01D 34/64; A01D 34/84; A01D 43/16
See application file for complete search history.

(56) References Cited

U.S. PATENT DOCUMENTS 4,374,465 A 2/1983 Comer
5,572,856 A * 11/1996 Ku ....................... A01D 34/008
56/2
(Continued)

FOREIGN PATENT DOCUMENTS

AT 338449 T 9/2006
CA 2490610 A1 7/2005
(Continued)

*Primary Examiner* — Alicia Torres
(74) *Attorney, Agent, or Firm* — Lee & Hayes, P.C.

(57) ABSTRACT

An autonomous lawn mower, moving and working in a working region, is disclosed, and includes: a housing, including a central axis in the longitudinal direction; a movement module configured to drive the housing to move; a cutting module configured to rotate with a first rotational axis being the center to form a cutting region, and including a cutting element; a cut-to-edge module configured to rotate with a second rotational axis being the center to form a cut-to-edge region, and including a cut-to-edge element, the cut-to-edge element being different from the cutting element; and a control module configured to control the autonomous lawn mower to move and work, where the first rotational axis and the second rotational axis are respectively located on two sides of the central axis.

18 Claims, 10 Drawing Sheets

(51) Int. Cl.
*A01D 34/64* (2006.01)
*A01D 34/84* (2006.01)
*A01D 43/16* (2006.01)
*A01D 101/00* (2006.01)

(52) U.S. Cl.
CPC ............ *A01D 34/84* (2013.01); *A01D 43/16* (2013.01); *A01D 2101/00* (2013.01)

(56) References Cited

U.S. PATENT DOCUMENTS

| | | | |
|---|---|---|---|
| 5,598,689 | A | 2/1997 | Bork |
| 6,009,358 | A * | 12/1999 | Angott ................ A01D 34/008 340/936 |
| 6,611,738 | B2 | 8/2003 | Ruffner |
| 6,928,798 | B2 | 8/2005 | Hensley et al. |
| 7,086,215 | B2 | 8/2006 | Hensley et al. |
| 8,046,103 | B2 * | 10/2011 | Abramson ........... A01D 34/008 367/105 |
| 8,464,504 | B1 | 6/2013 | Huff |
| 8,634,960 | B2 * | 1/2014 | Sandin ................. B60L 3/0023 700/258 |
| 8,783,005 | B1 * | 7/2014 | Bernard ................ A01D 34/84 56/13.7 |
| 10,681,863 | B2 * | 6/2020 | Hans .................... G05D 1/0225 |
| 11,297,766 | B1 * | 4/2022 | Wynn-Grayson ...... A01D 34/90 |
| 2003/0230065 | A1 | 12/2003 | Hennum |
| 2005/0144922 | A1 | 7/2005 | Hensley et al. |
| 2005/0183410 | A1 | 8/2005 | Hensley et al. |
| 2012/0174551 | A1 | 7/2012 | Hayward |
| 2018/0054963 | A1 | 3/2018 | Lydon et al. |
| 2018/0064028 | A1 | 3/2018 | Cmich et al. |
| 2023/0042864 | A1 * | 2/2023 | Danling ................ A01D 34/78 |
| 2023/0320262 | A1 * | 10/2023 | Woo ....................... G05D 1/245 56/10.2 A |

FOREIGN PATENT DOCUMENTS

| | | |
|---|---|---|
| CA | 2806838 A1 | 5/2013 |
| CA | 2867199 A1 | 5/2013 |
| CA | 2920175 A1 | 5/2013 |
| CA | 2806838 C | 1/2015 |
| CA | 2867199 C | 5/2016 |
| CN | 1636429 A | 7/2005 |
| CN | 104969723 A | 10/2015 |
| CN | 106717479 A | 5/2017 |
| CN | 206743885 U | 12/2017 |
| CN | 206948918 U | 2/2018 |
| DE | 29609457 U1 | 9/1996 |
| DE | 19928270 A1 | 12/2000 |
| DE | 212016000020 U1 | 6/2017 |
| EP | 1550363 A1 | 7/2005 |
| EP | 1550363 B1 | 9/2006 |
| EP | 1716734 A2 | 11/2006 |
| EP | 2547193 B1 | 3/2017 |
| EP | 1996987 B1 | 10/2018 |
| GB | 2417665 A | 3/2006 |
| JP | 2005-198653 A | 7/2005 |
| JP | 3946726 B2 | 7/2007 |
| JP | 5964471 B1 | 7/2016 |
| KR | 20050071379 A | 7/2005 |
| KR | 100684331 B1 | 2/2007 |
| WO | WO-2011115536 A1 * | 9/2011 ........... A01D 34/008 |
| WO | 2014/123915 A1 | 8/2014 |
| WO | 2018/000922 A1 | 1/2018 |
| WO | WO-2020052619 A1 * | 3/2020 ........... A01D 34/008 |
| WO | WO-2023121527 A1 * | 6/2023 |

* cited by examiner

AUTONOMOUS LAWN MOWER WITH EDGER AND CONTROL METHOD THEREOF

This application is a National Stage Application of International Application No. PCT/CN2019/089315, filed on May 30, 2019, which claims benefit of and priority to Chinese Patent Application No. 201810540754.4, filed on May 30, 2018 and Chinese Patent Application No. 201811064195.0, filed on Sep. 12, 2018, all of which are hereby incorporated by reference in their entirety for all purposes as if fully set forth herein.

BACKGROUND

Technical Field

The embodiments of the present invention relate to an autonomous lawn mower and a control method thereof, and in particular, to an autonomous lawn mower with a cut-to-edge function and a control method thereof.

Related Art

With the development of science and technology, intelligent self-moving devices become popular. Self-moving devices can automatically perform preset related tasks through preset programs without human operation and intervention, and are therefore widely applied to industrial applications and household products.

An autonomous lawn mower is used as an example. The autonomous lawn mower usually works on a lawn. A user sets a working region for the autonomous lawn mower. The autonomous lawn mower detects a relative location relationship between the autonomous lawn mower and the working region and keeps the autonomous lawn mower within the working region to prevent the autonomous lawn mower from moving out of a boundary. A cutting module of the autonomous lawn mower is usually a rigid element such as a blade. When cutting grass at a high speed, the cutting module may easily inflict damage to a human body or another object. To avoid such harm, a shield is usually mounted around the cutting module. To also meet the trafficability requirement of the autonomous lawn mower, the shield needs to be kept at a particular height, and needs to be at a particular distance from the cutting module in the horizontal direction. That is, when the autonomous lawn mower moves along a boundary of the working region including a boundary of an obstacle, there is still the distance between the cutting module and an actual boundary. The distance results in a region in which the autonomous lawn mower cannot perform mowing on the lawn, and the user needs to perform secondary processing in the region.

SUMMARY

To overcome defects of the prior art, the problem that the embodiments of the present invention needs to resolve is to provide an autonomous lawn mower that can cut to an edge of a working region and has a compact layout.

The technical solutions adopted in the embodiments of the present invention to resolve the problem in the prior art are as follows.

An autonomous lawn mower is provided, moving and working in a working region, and including: a housing, including a central axis in the longitudinal direction; a movement module, mounted in the housing, and driving the housing to move; a cutting module, mounted in the housing, the cutting module rotating with a first rotational axis being the center to form a cutting region, the cutting module including a cutting element; a cut-to-edge module, mounted in the housing, the cut-to-edge module rotating with a second rotational axis being the center to form a cut-to-edge region, the cut-to-edge module including a cut-to-edge element, the cut-to-edge element being different from the cutting element; and a control module, electrically connected to the movement module, the cutting module, and the cut-to-edge module, and controlling the autonomous lawn mower to move and work, where the first rotational axis and the second rotational axis are respectively located on two sides of the central axis.

In one of the embodiments, the cut-to-edge region at least partially protrudes from the housing.

In one of the embodiments, a projection of the second rotational axis in the height direction is located in the housing.

In one of the embodiments, the distance between the first rotational axis and the central axis is less than or equal to the distance between the second rotational axis and the central axis.

In one of the embodiments, the distance between the first rotational axis and the central axis is a first distance, the distance between the second rotational axis and the central axis is a second distance, the first distance is less than the second distance, and the difference between the second distance and the first distance is less than or equal to the sum of the radius of the cutting region and the radius of the cut-to-edge region.

In one of the embodiments, the autonomous lawn mower includes a cut-along-edge mode and a cut-to-edge mode; in the cut-along-edge mode, the control module controls the cutting module to work, and the movement module moves along a boundary of the working region in a first direction to make the side on which the first rotational axis is located face the outside of the working region; in the cut-to-edge mode, the control module controls the cut-to-edge module to work, and the movement module moves along the boundary of the working region in a second direction to make the side on which the second rotational axis is located face the outside of the working region; and the first direction is opposite to the second direction.

In one of the embodiments, the cut-to-edge element includes a flexible cutter.

A technical solution adopted in the present invention to resolve the problem in the prior art is as follows.

An autonomous lawn mower is provided, moving and working in a working region, and including: a housing, including a central axis in the longitudinal direction; a movement module, mounted in the housing, and driving the housing to move; a cutting module, mounted in the housing, the cutting module rotating with a first rotational axis being the center to form a cutting region; a cut-to-edge module, mounted in the housing, the cut-to-edge module rotating with a second rotational axis being the center to form a cut-to-edge region, the second rotational axis being located on one side of the central axis; a detection module, mounted in the housing, and used for detecting a boundary of the working region; and a control module, electrically connected to the movement module, the cutting module, the cut-to-edge module, and the detection module, and controlling the autonomous lawn mower to move and work, where the autonomous lawn mower includes a cut-to-edge mode, and in the cut-to-edge mode, the control module controls the cut-to-edge module to work, and the control module controls, based on the boundary of the working region detected by the detection module, the movement module to move along the boundary to make the side of the second rotational axis face the outside of the working region.

In one of the embodiments, the autonomous lawn mower includes a cut-along-edge mode, and in the cut-along-edge mode, the control module controls the cutting module to work, and the movement module moves along the boundary.

In one of the embodiments, the first rotational axis is located on the other side of the central axis, and in the cut-along-edge mode, a direction in which the movement module moves along the boundary is opposite to a moving direction in the cut-to-edge mode.

In one of the embodiments, when the cut-along-edge mode is completed, the control module starts the cut-to-edge mode.

In one of the embodiments, the autonomous lawn mower includes a detection module that detects the boundary of the working region, and the control module controls, based on the boundary detected by the detection module, the movement module to move along the boundary.

In one of the embodiments, the distance between the first rotational axis and the central axis is less than or equal to the distance between the second rotational axis and the central axis.

In one of the embodiments, the distance between the first rotational axis and the central axis is a first distance, the distance between the second rotational axis and the central axis is a second distance, the first distance is less than the second distance, and the difference between the second distance and the first distance is less than or equal to the sum of the radius of the cutting region and the radius of the cut-to-edge region.

In one of the embodiments, the cut-to-edge module includes a cut-to-edge element, and the cut-to-edge element includes a flexible cutter.

Another technical solution adopted in the present invention to resolve the problem in the prior art is as follows.

A control method of an autonomous lawn mower is provided, the autonomous lawn mower moving and working in a working region and including a cutting module and a cut-to-edge module, the autonomous lawn mower including a central axis in the longitudinal direction, the cut-to-edge module being located on one side of the central axis, where the control method of the autonomous lawn mower includes:

determining whether a cut-to-edge-mode start condition is met, and if yes, controlling the cut-to-edge module to work and controlling the autonomous lawn mower to move along a boundary of the working region to make the side of the cut-to-edge module face the outside of the working region.

In one of the embodiments, the control method further includes: detecting the boundary of the working region, and controlling, based on the boundary detected by a detection module, a movement module to move along the boundary.

In one of the embodiments, the control method further includes: determining whether a cut-along-edge mode start condition is met, and if yes, controlling the cutting module to work and controlling the autonomous lawn mower to move along the boundary of the working region.

In one of the embodiments, the cutting module is located on the other side of the central axis, and the control method includes: determining whether the cut-along-edge mode start condition is met, and if yes, controlling the autonomous lawn mower to move along the boundary to make the other side face the outside of the working region.

In one of the embodiments, the cut-to-edge-mode start condition includes that cut-along-edge work is completed.

Compared with the prior art, the beneficial effects of the present invention are that a cutting module and a cut-to-edge module are separately disposed on an autonomous lawn mower to expand the cutting range of the autonomous lawn mower, so that the autonomous lawn mower can cut plants such as grass along an edge of a working region or shrink an uncuttable range along the edge of the working region, thereby greatly reducing the workload of a user and improving the working efficiency of the user and the agricultural production efficiency.

BRIEF DESCRIPTION OF THE DRAWINGS

To describe the technical solutions in the specific embodiments of the present invention or in the prior art more clearly, the following briefly describes the accompanying drawings required for describing the specific embodiments or the prior art. Apparently, the accompanying drawings in the following description show some embodiments of the present invention, and a person of ordinary skill in the art may still derive other drawings from these accompanying drawings without creative efforts.

DETAILED DESCRIPTION

Figure 1:
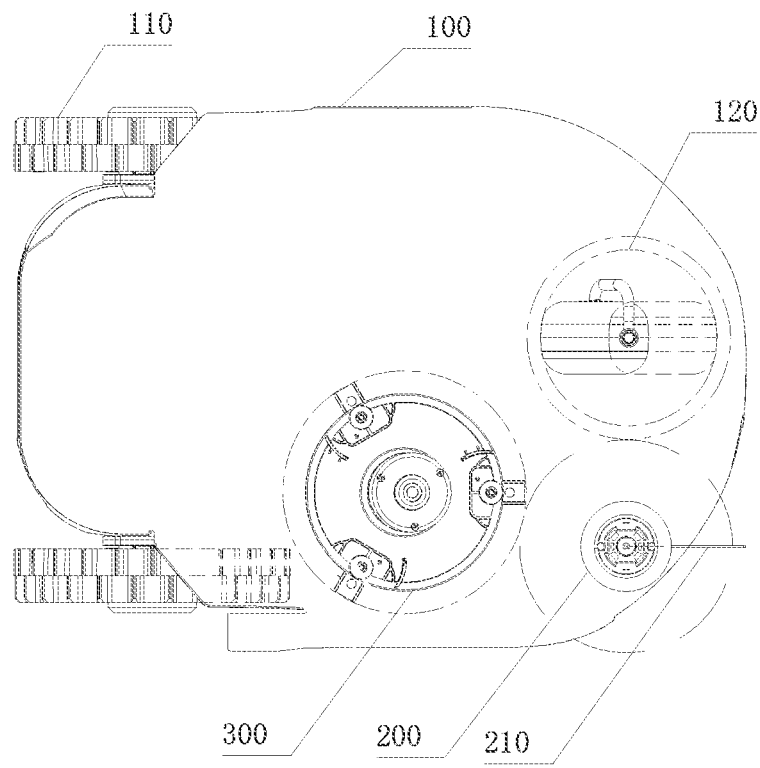
FIG. 1 is a schematic diagram of an autonomous lawn mower according to an embodiment of the present invention.

The technical solutions in the present invention are clearly and completely described below with reference to the accompanying drawings. Apparently, the described embodiments are merely some of rather than all of the embodiments of the present invention. All other embodiments obtained by a person of ordinary skill in the art based on the embodiments of the present invention without creative efforts shall fall within the protection scope of the present invention.

In the description of the present invention, it should be noted that orientation or position relationships indicated by the terms such as "center", "above", "below", "left", "right", "vertical", "horizontal", "inside", and "outside" are based on orientation or position relationships shown in the accompanying drawings, and are used only for ease and brevity of illustration and description of the present invention, rather than indicating or implying that the mentioned apparatus or component may have a particular orientation or may be constructed and operated in a particular orientation. Therefore, such terms should not be construed as limiting of the present invention. In addition, terms "first", "second", and "third" are only used to describe the objective and cannot be understood as indicating or implying relative importance.

In the description of the present invention, it should be noted that unless otherwise explicitly specified or defined, the terms such as "mount", "install", "connect", and "connection" should be understood in a broad sense. For example, the connection may be a fixed connection, a detachable connection, or an integral connection; or the connection may be a mechanical connection or an electrical connection; or the connection may be a direct connection, an indirect connection through an intermediary, or internal communication between two components. The specific meanings of the above terms in the present invention may be understood according to specific circumstances for a person of ordinary skill in the art.

Referring to FIG. 1 to FIG. 11, an autonomous lawn mower includes a housing 100 and a movement module, a cutting module 300, a cut-to-edge module 200, and a detection module that are mounted in the housing 100. The movement module includes a driving wheel 110 driven by a drive motor and a driven wheel 120 that are not driven by the drive motor. The detection module is used for detecting a boundary of a working region. The autonomous lawn mower further includes a control module, used for controlling the movement module, the cutting module or the cut-to-edge module, to control the autonomous lawn mower to move and work. The cutting module 300 includes a cutting driving part and a cutting part. The cutting driving part is drivingly connected to the cutting part. The cutting part includes a cutting element. The cut-to-edge module 200 includes a cut-to-edge driving part and a cut-to-edge part, the cut-to-edge driving part being drivingly connected to the cut-to-edge part, and includes a cut-to-edge element. A cut-to-edge region is formed when the cut-to-edge part works. The cut-to-edge region protrudes from the housing 100. In this embodiment, at least one of the attributes such as the material, sharpness, weight, and size of the cut-to-edge element is different from that of the cutting element.

With the cooperation of the cut-to-edge module 200 and the cutting module 300, the cutting range of the autonomous lawn mower can be expanded, so that the autonomous lawn mower can cut plants such as grass along an edge of a working region or an uncut range along the edge of the working region and plants such as grass can be shrunk, thereby greatly reducing the workload of a user and improving the working efficiency of the user and the agricultural production efficiency.

It may be understood that the autonomous lawn mower provided in this embodiment further includes a detection module, a communication module, a positioning module or the like that is used for assisting the autonomous lawn mower in working within a working region preset by a user, to avoid an obstacle or the like. The working region may be an entire region or a region with obstacles such as a rockery and a lake. The topography of the working region may be a meadow, a farmland, a garden or the like. In some embodiments, the autonomous lawn mower can receive a signal sent by a remote device through the communication module. The remote device may include a server, user equipment, and the like. The control module may control the autonomous lawn mower to perform a corresponding operation according to the signal received by the communication module.

In this embodiment, the longitudinal direction of the housing 100 is a moving direction of the housing. The transverse direction of the housing 100 is perpendicular to the moving direction and the height direction of the housing.

Figure 2:
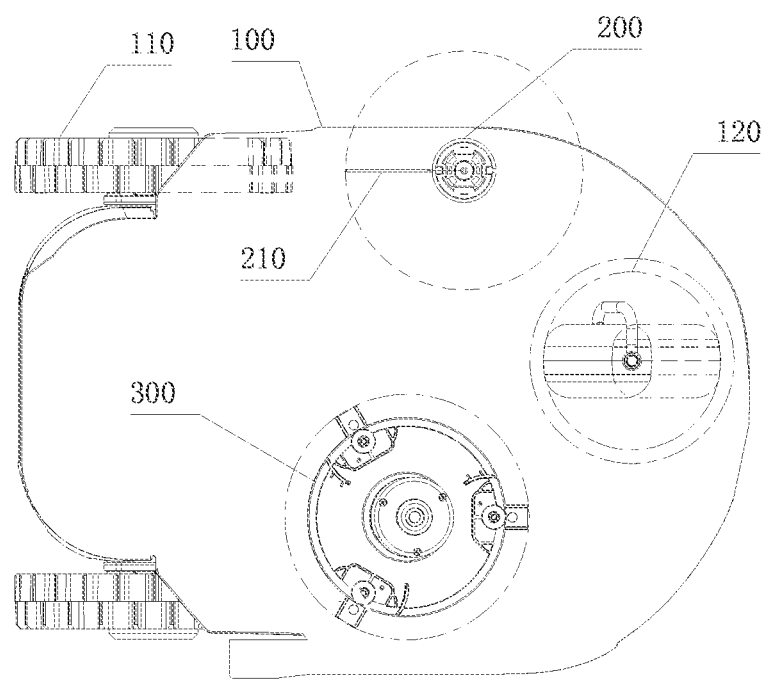
FIG. 2 is a schematic diagram of an autonomous lawn mower according to an embodiment of the present invention.

As shown in FIG. 2, in an embodiment, the cutting module 300 includes a cutting deck and a cutting element mounted on the cutting deck. The cut-to-edge module 200 includes a trimmer head and a trimmer line mounted on the trimmer head. The cutting module 300 forms a cutting region with a first rotational axis being the center. The cutting region is specifically a region formed by the rotation of the cutting element. The cut-to-edge module 200 forms a cut-to-edge region with a second rotational axis being the center. The cut-to-edge region is specifically a region formed by the rotation of the trimmer line.

In an embodiment, the cutting module 300 may be disposed on any position of the bottom of the housing 100. Optionally, the cutting module 300 is disposed deviating from a central axis in the longitudinal direction of the housing 100, and the cut-to-edge module 200 and the cutting module 300 are respectively disposed on two sides of the central axis of the housing 100 to facilitate the cooperation of the cutting module 300 and the cut-to-edge module 200 for better cutting of plants such as grass in a working region and an edge of the working region, to make the structure of the autonomous lawn mower more compact, so that the housing 100 can accommodate both the cut-to-edge module 200 and the cutting module 300, thereby avoiding high increases in the length and width of the autonomous lawn mower.

In an embodiment, a position of a projection of the cut-to-edge driving part in the height direction of the housing 100 is fixed relative to the housing 100. The position of the projection of the cut-to-edge driving part is fixed relative to the housing 100, so that the structure of the cut-to-edge module 200 is simplified to further simplify the structure of the autonomous lawn mower.

As shown in FIG. 2, in an embodiment, in the height direction of the housing 100, a projection of the second rotational axis in the height direction is located in the housing 100. Further, the main body part of the cut-to-edge module 200 is located in the housing 100. Therefore, in a normal working state, the autonomous lawn mower can keep an original moving and working manner as much as possible without being affected by the cut-to-edge module 200.

In an embodiment, at least a part of the cut-to-edge region protrudes from the housing 100. When the autonomous lawn mower moves along a wall or another obstacle, the part, protruding from the housing 100, of the cut-to-edge region can implement complete cutting along an edge of the obstacle.

In an embodiment, the cut-to-edge module 200 includes a flexible trimming element 210 used for trimming plants. The flexible trimming element 210 includes a trimmer line, a flexible plastic blade, a flexible rubber blade or another structure. Optionally, the flexible trimming element 210 may deform when touching a human body, a fence, a wall or the like, or the flexible trimming element 210 retracts the blade such as the flexible plastic blade or the flexible rubber blade when touching a human body, a fence, a wall or the like, to reduce the damage to objects such as the human body, the fence, the wall, especially, to the human body. The flexible trimming element 210 basically does not deform when touching grass or plants similar to the grass, so that it is ensured that the flexible trimming element 210 can cut grass or plants similar to grass.

In an embodiment, the cutting module 300 includes a rigid cutting element such as a rigid blade used for cutting plants. Therefore, the cutting module 300 causes more severe damage when touching a human body, a fence, a wall or the like. Therefore, the distance in the transverse direction between the cutting module 300 and an edge of the housing 100 is relatively long to use the housing 100 for protection. However, to implement cutting to an edge, the cut-to-edge region generated by the cut-to-edge module 200 protrudes from the housing 100. If the distance between the second rotational axis and the central axis is greater than or equal to the distance between the first rotational axis and the central axis, the radius of the cut-to-edge region is greater than the radius of the cutting region and a region in which the cut-to-edge module 200 works overlaps a region in which the cutting module 300 works, thereby increasing the energy consumption of the cut-to-edge module 200. Therefore, in this embodiment, the distance between the first rotational axis and the central axis is a first distance, the distance between the second rotational axis and the central axis is a second distance, and the first distance is less than the second distance.

In an embodiment, the maximum size of an overlap between the moving trajectory of the cut-to-edge region of the cut-to-edge module 200 and the moving trajectory of the cutting region of the cutting module 300 is not less than 5 mm, to avoid a dead zone between the trimming region of the cut-to-edge module 200 and the cutting region of the cutting module 300, and to further avoid a case in which plants such as grass near the edge of the working region cannot be cut.

Optionally, the maximum size of an overlap between the moving trajectory of the cut-to-edge region of the cut-to-edge module 200 and the moving trajectory of the cutting region of the cutting module 300 is 5 mm, 6 mm, 8 mm, 10.5 mm, 20 mm or the like. The size of the overlapping region may be determined according to the structure of an autonomous lawn mower, a working scenario or the like. Details are not specifically limited.

In this embodiment, the overlap between the moving trajectory of the cut-to-edge region of the cut-to-edge module 200 and the moving trajectory of the cutting region of the cutting module 300 includes manners in which the cut-to-edge region of the cut-to-edge module 200 overlaps or does not overlap the cutting region of the cutting module 300. For example, there is an overlapping part between the projection of the cut-to-edge region of the cut-to-edge module 200 and a projection of the cutting region of the cutting module 300 that are in the height direction of the housing 100. In another example, the projection of the cut-to-edge region of the cut-to-edge module 200 and the projection of the cutting region of the cutting module 300 that are in the height direction of the housing 100 are arranged at intervals. However, there is an overlapping part between a projection of the cut-to-edge region of the cut-to-edge module 200 and a projection of the cutting region of the cutting module 300 that are in the transverse direction of the housing. Alternatively, another arrangement manner is used.

In an embodiment, the distance between the first rotational axis and the central axis is a first distance, the distance between the second rotational axis and the central axis is a second distance, and the difference between the second distance and the first distance is less than or equal to the sum of the radius of a main cutting region and the radius of an auxiliary cutting region. During movement, a region formed after the cutting module 300 completes working is approximately a region a whose width is equal to the diameter of the main cutting region, and a region formed after the cut-to-edge module 200 completes working is approximately a region b whose width is equal to the diameter of the auxiliary cutting region. If there is a gap between the region a and the region b in the transverse direction, that is, the difference between the first distance and the second distance is greater than the sum of the radius of the main cutting region and the radius of the auxiliary cutting region, there is still an uncut region surrounding an obstacle after the cutting module 300 and the cut-to-edge module 200 complete working. Consequently, the control module controls a relative distance between the movement module and the boundary of the working region and controls the movement module to move along the boundary of the working region again to implement cutting in the uncut region. Such working method increases the load for the control module and reduces the working efficiency of the autonomous lawn mower. Therefore, when the difference between the second distance and the first distance is less than or equal to the sum of the radius of the main cutting region and the radius of the auxiliary cutting region, the region a is tangent to or intersects the region b in the transverse direction, to ensure that complete cutting is implemented around an obstacle after the cutting module 300 and the cut-to-edge module 200 complete work.

In an embodiment, the boundary of the working region may be a boundary wire on or near the edge of the working region or another signal generation apparatus deployed by a user or may be a physical boundary formed by a fence, a flower bed or the like in the working region or may be a boundary determined in a manner such as the recognition of a working surface by the autonomous lawn mower or positioning. Correspondingly, the detection module may include a sensor that detects boundary signals, a sensor that detects the physical boundary, a sensor that detects the working surface, a positioning sensor or the like.

In an embodiment, there is no overlap between the projection of the cut-to-edge region of the cut-to-edge module 200 and the projection of the cutting region of the cutting module 300 that are in the height direction of the housing 100. If there is an overlap between the cut-to-edge region and the cutting region, when the cut-to-edge module 200 and the cutting module 300 are at the same height, the simultaneous start of the cut-to-edge module 200 and the cutting module 300 may cause mutual interference, to cause damage to the cutting element and the cut-to-edge element by contact during working. Therefore, when there is no overlap between a cut-to-edge region and a cutting region, the service life of the cut-to-edge element and/or the cutting element can be increased, thereby reducing the number of times of intervention by a user.

In an embodiment, the control module is used for, when controlling the movement module to make the autonomous lawn mower move along the boundary of the working region in the first direction, controlling the cutting driving part to drive the cutting module 300 to work and/or controlling the cut-to-edge driving part to drive the cut-to-edge module 200 to work. The control module is further used for, when controlling the movement module to make the autonomous lawn mower move along the boundary of the working region in the second direction, controlling the cut-to-edge driving part to drive the cut-to-edge module 200 to work and/or controlling the cutting driving part to drive the cutting module 300 to work. The second direction is an opposite direction of the first direction. With the cooperation of the cut-to-edge module 200 and the cutting module 300, plants such as grass in the working region and a region along the edge of the working region are better cut.

In an embodiment, the control module is used for, when controlling the movement module to make the autonomous lawn mower move along the boundary of the working region in the first direction, controlling the cutting driving part to drive the cutting module 300 to work. The control module is used for controlling, when controlling the movement module to make the autonomous lawn mower move along the boundary of the working region in the second direction, the cut-to-edge driving part to drive the cut-to-edge module 200 to work. The cutting module 300 works during movement in the first direction, and the cut-to-edge module 200 works during movement in the second direction. In this way, an actual cutting width of the cut-to-edge module 200 is reduced to enhance the edge-cutting effect, and the wear of the cut-to-edge module 200 is reduced, to make the cut-to-edge module 200 more durable.

In an embodiment, the cut-to-edge module 200 is disposed on the left side or the right side of the cutting module 300 in the transverse direction of the housing 100.

In an embodiment, the cut-to-edge module 200 is disposed on the front side of the cutting module 300 in the longitudinal direction of the housing 100. The "front side" in this embodiment is described in a direction toward the head of the autonomous lawn mower, and the "rear side" indicates a direction toward the tail of the autonomous lawn mower.

In an embodiment, there is one cut-to-edge module 200, and the cut-to-edge module 200 is disposed in front, in side front, in the side rear, in rear, on the left side or on the right side of the cutting module 300. Alternatively, there are two cut-to-edge modules 200, the cut-to-edge modules 200 are disposed in side front or on the sides of the cutting module 300, and the two cut-to-edge modules 200 are disposed symmetrically along an axis in the moving direction of the housing 100.

Figure 5:
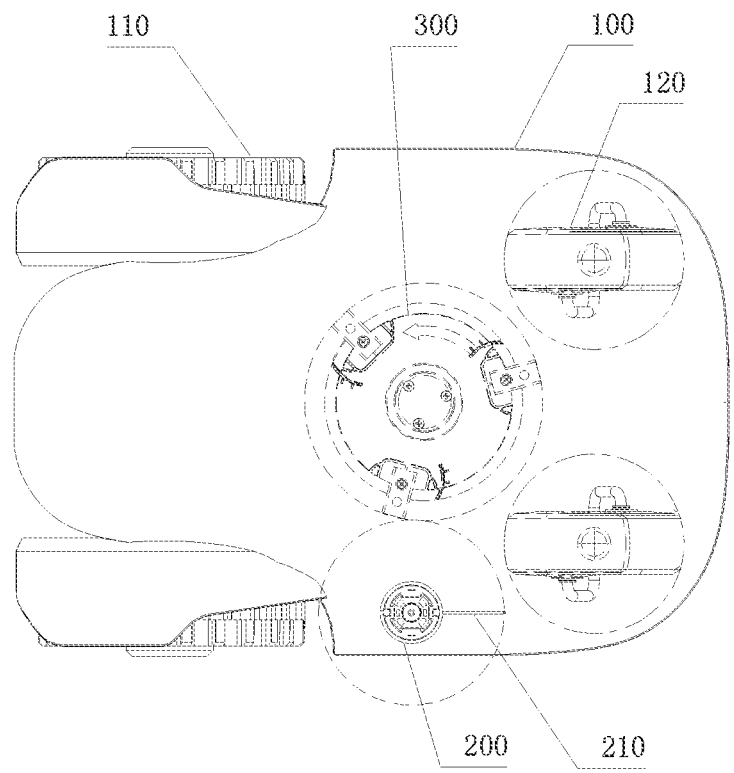
FIG. 5 is a schematic diagram of an autonomous lawn mower according to an embodiment of the present invention.
Figure 6:
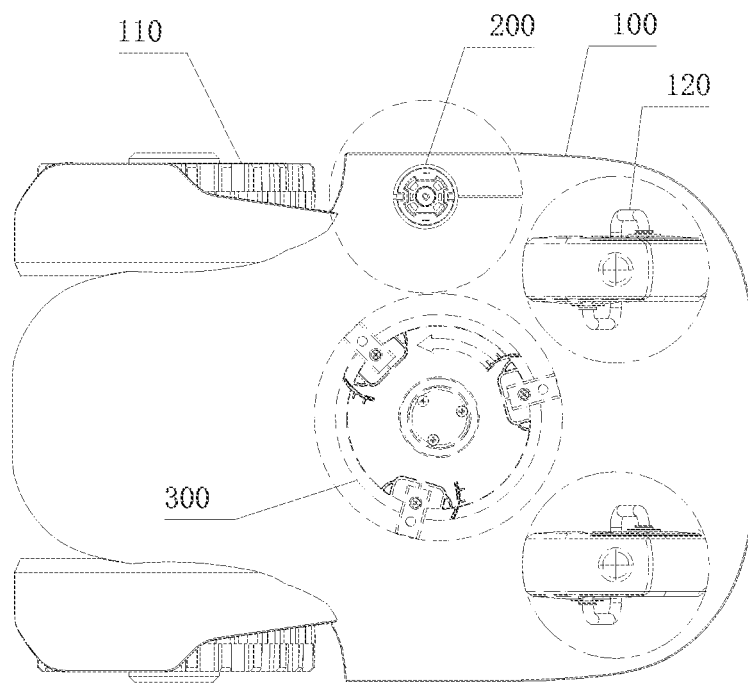
FIG. 6 is a schematic diagram of an autonomous lawn mower according to an embodiment of the present invention.
Figure 7:
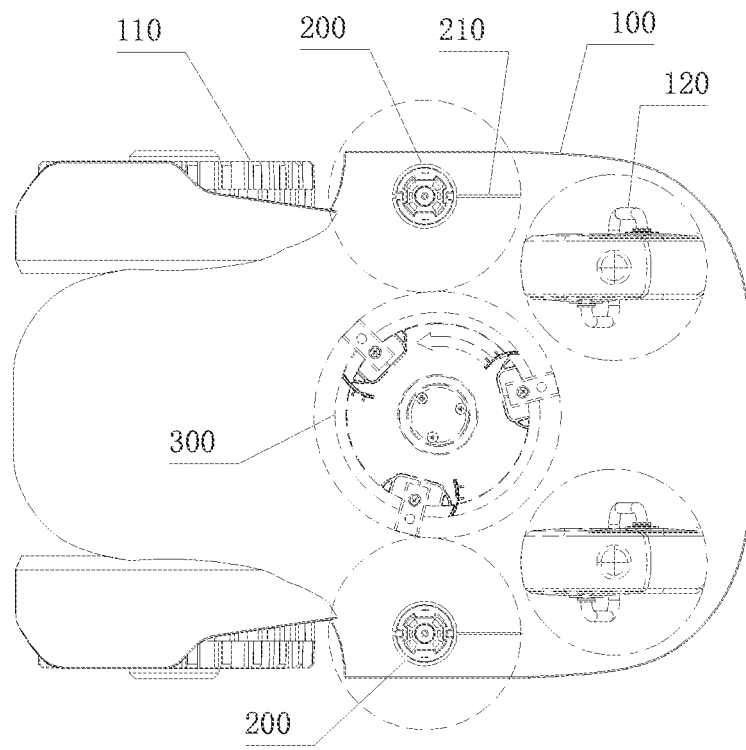
FIG. 7 is a schematic diagram of an autonomous lawn mower according to an embodiment of the present invention.
Figure 8:
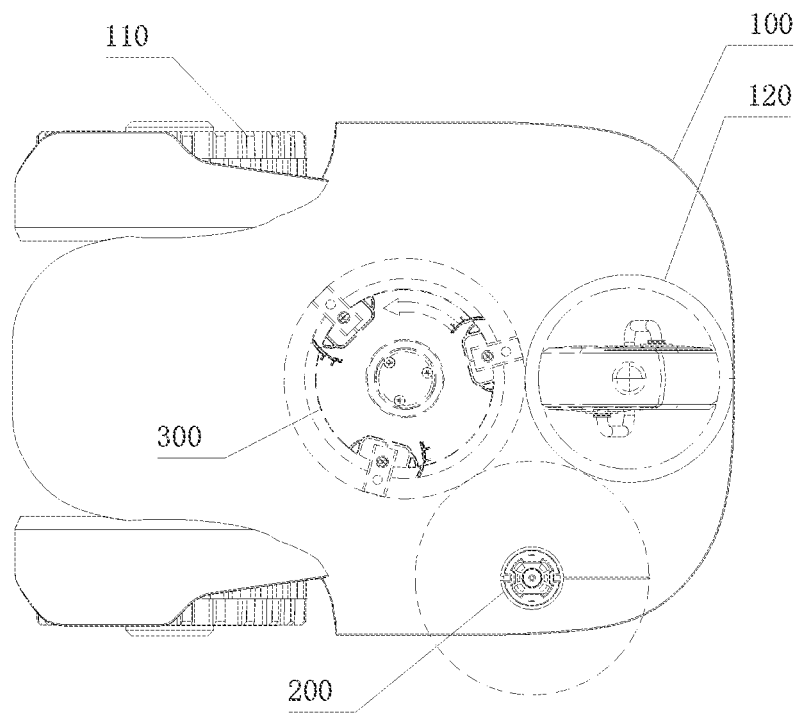
FIG. 8 is a schematic diagram of an autonomous lawn mower according to an embodiment of the present invention.
Figure 9:
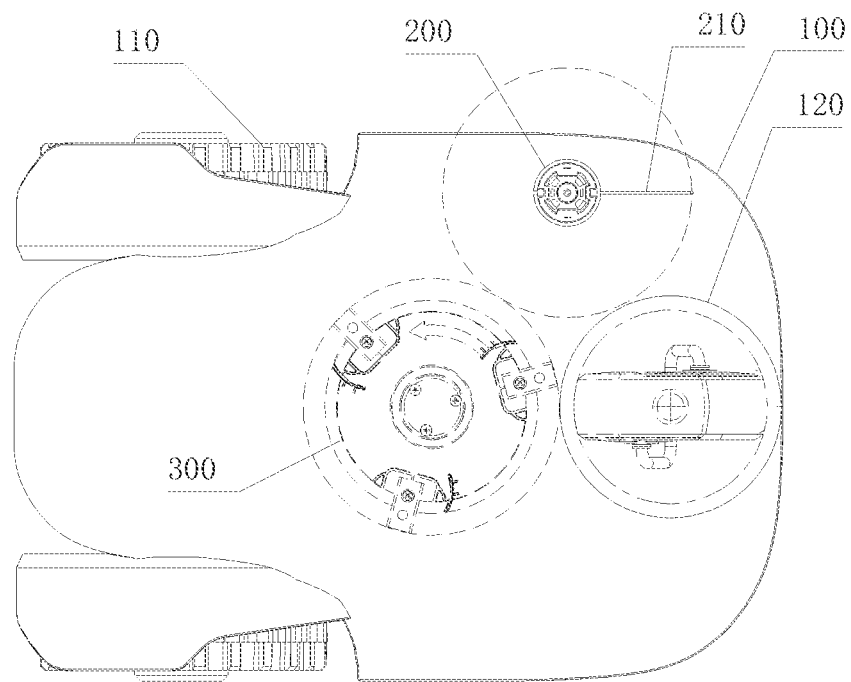
FIG. 9 is a schematic diagram of an autonomous lawn mower according to an embodiment of the present invention.
Figure 10:
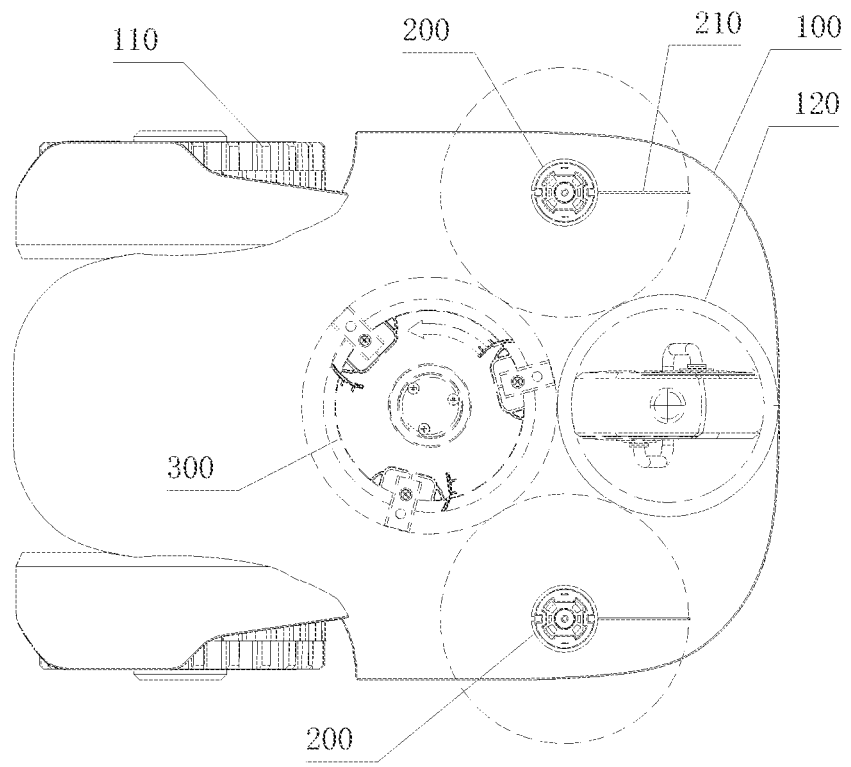
FIG. 10 is a schematic diagram of an autonomous lawn mower according to an embodiment of the present invention.
Figure 11:
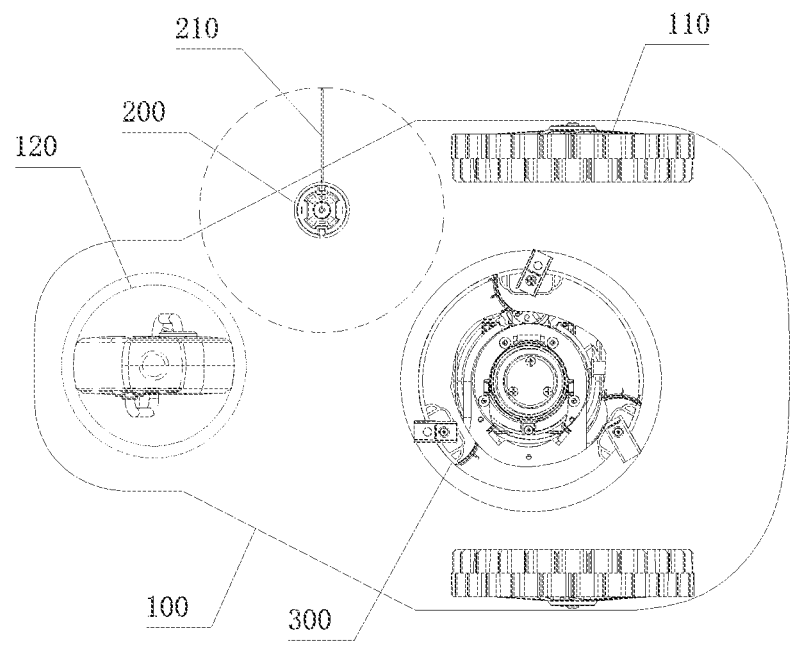
FIG. 11 is a schematic diagram of an autonomous lawn mower according to an embodiment of the present invention.

Referring to FIG. 5 to FIG. 11, the cutting module 300 is disposed on the axis in the moving direction of the housing 100. FIG. 5 and FIG. 6 respectively show that the cut-to-edge module 200 is disposed on the left side of the cutting module 300 and the cut-to-edge module 200 is disposed on the right side of the cutting module 300. FIG. 7 shows that the two cut-to-edge modules 200 are symmetrically disposed on two sides of the cutting module 300. FIG. 8 and FIG. 9 respectively show that the cut-to-edge module 200 is disposed in the left front of the cutting module 300 and the cut-to-edge module 200 is disposed in the right front of the cutting module 300. FIG. 10 shows that the two cut-to-edge modules 200 are symmetrically disposed in side front of the cutting module 300. FIG. 11 shows that one cut-to-edge module 200 is disposed in the side rear of the cutting module 300. It is to be noted that in the autonomous lawn mower in FIG. 10, the two driving wheels 110 are located at the tail, and the driven wheel 120 is located at the head. There are two driven wheels 120 in FIG. 5 to FIG. 7, and there is one driven wheel 120 in FIG. 8 to FIG. 10. In the autonomous lawn mower in FIG. 11, the two driving wheels 110 are located at the head, and the driven wheel 120 is located at the tail. The figure shows one driven wheel 120.

Optionally, the cutting module 300 is disposed deviating from the axis in the moving direction of the housing 100. At least one cut-to-edge module 200 is disposed in at least one or more of front, side front, the side rear, rear, and the side of the cutting module 300.

Optionally, there is one cutting module 300 and one cut-to-edge module 200. The cut-to-edge module 200 is disposed in front, in side front, in rear, on the left side or on the right side of the cutting module 300. Alternatively, there are two cut-to-edge modules 200. The two cut-to-edge modules 200 are disposed symmetrically in side front of the cutting module 300 along the axis in the moving direction of the housing 100. Alternatively, one of the cut-to-edge modules 200 is disposed in front of the cutting module 300 and the other cut-to-edge module 200 is disposed on a side of the cutting module 300.

In an embodiment, optionally, one or more of the head, the middle, and the tail at the bottom of the housing 100 is provided with the cut-to-edge module 200. There may be one or more cut-to-edge modules 200, for example, one cut-to-edge module 200, two cut-to-edge modules 200, three cut-to-edge modules 200 or five cut-to-edge modules 200. A plurality of the cut-to-edge modules 200 may be evenly distributed on the circumference of the bottom of the housing 100 or may be disposed at the bottom of the housing 100 according to preset positions. The quantity of the cut-to-edge modules 200 may be determined according to elements such as the volume and the structure of the autonomous lawn mower.

In an embodiment, there may be one or more cutting modules 300, for example, one cutting module 300, two cutting modules 300, three cutting modules 300 or five cutting modules 300. A plurality of the cutting modules 300 may be arranged in the height direction of the housing 100 or may be arranged in a direction that is perpendicular to the height direction of the housing 100. The quantity of the cutting module 300 may be determined according to factors such as the volume of the autonomous lawn mower, the structure of the cut-to-edge module 200, and the size of the cutting module 300.

Figure 3:
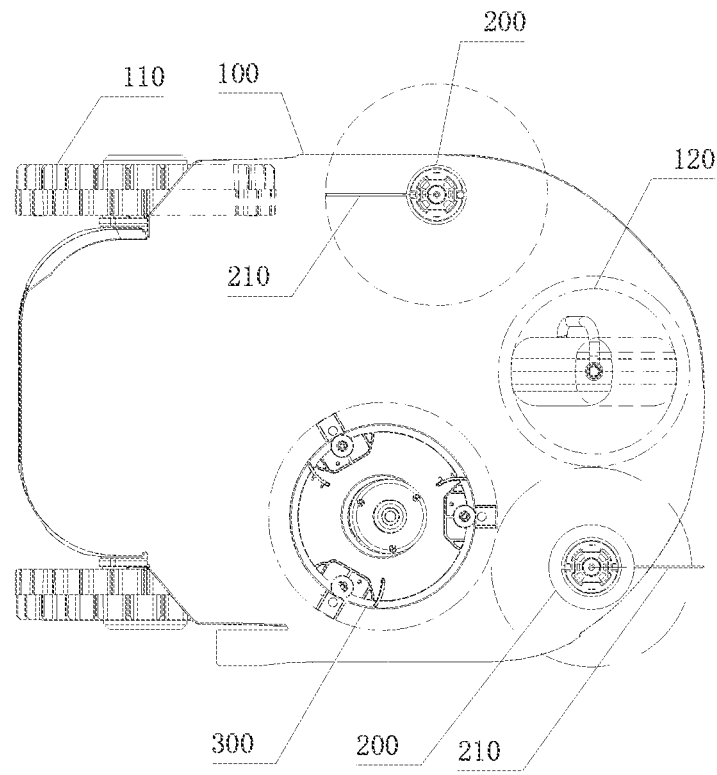
FIG. 3 is a schematic diagram of an autonomous lawn mower according to an embodiment of the present invention.
Figure 4:
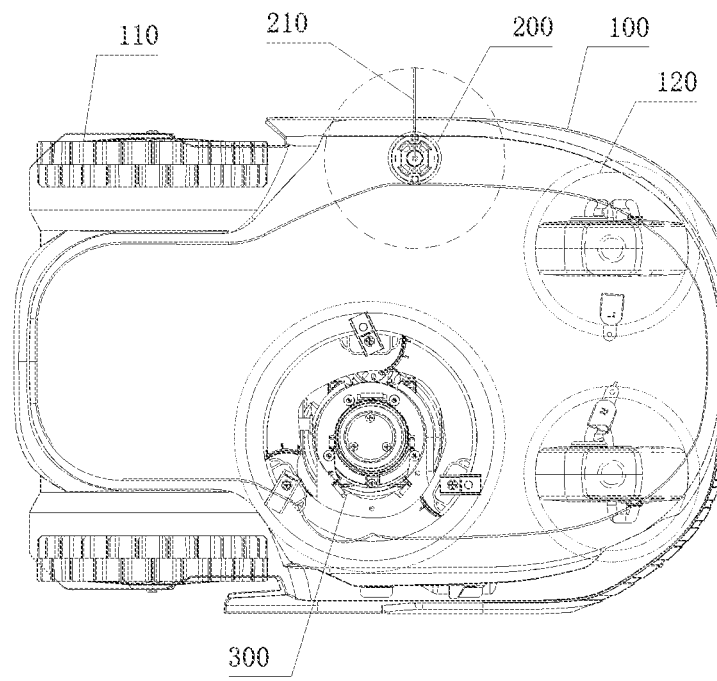
FIG. 4 is a schematic diagram of an autonomous lawn mower according to an embodiment of the present invention.

Referring to FIG. 1 to FIG. 4, the cutting module 300 is disposed deviating from the axis in the moving direction of the housing 100. FIG. 1 shows that the cut-to-edge module 200 is disposed in front of the cutting module 300. FIG. 2 and FIG. 4 respectively show that the cut-to-edge module 200 is disposed on one side or in side front of the cutting module 300 and the cut-to-edge module 200 and the cutting module 300 are disposed on two sides of the axis in the moving direction of the housing 100. FIG. 3 shows that one cut-to-edge module 200 is disposed in front of the cutting module 300 and the other cut-to-edge module 200 is disposed on one side of the cutting module 300. It is to be noted that in the autonomous lawn mower in FIG. 4, the two driving wheels 110 are located at the tail, and the driven wheel 120 is located at the head. There may be two driven wheels 120 in FIG. 4. and there may be one driven wheel 120 in FIG. 1 to FIG. 3.

In the autonomous lawn mower in this embodiment, the driving wheel 110 may be located at the tail and the driven wheel 120 may be at the head, or the driving wheel 110 may be located at the head and the driven wheel 120 may be located at the tail. There may be one driving wheel 110 and two driven wheels 120 in the autonomous lawn mower. Alternatively, there may be two driving wheels 110 and one or two driven wheels 120. Alternatively, another manner may be used. The specific quantity and arrangement positions of the cut-to-edge module 200 and the cutting module 300 may be determined according to factors such as the arrangement of the driving wheel 110 and the driven wheel 120, the volume of the autonomous lawn mower, the structures of the cut-to-edge module 200 and cutting module 300, the structure of the autonomous lawn mower, and costs.

Optionally, the trimmerline may be, for example, a nylon mowing line, a mowing line with a steel wire inside and nylon sleeved outside, a mowing line of a metal material or a mowing line of another plastic material.

Optionally, the cutting module 300 includes a rigid cutting element used for cutting plants. The rigid cutting element includes a metal cutting blade, a stone cutting blade or an element of another material. The effect of cutting plants such as grass by the rigid cutting element is better than that by the flexible trimming element 210.

Optionally, the cut-to-edge module 200 includes the flexible trimming element 210, and the cutting module 300 includes the rigid cutting element. With the cooperation of the cut-to-edge module 200 that includes the flexible trimming element 210 and the cutting module 300 that includes the rigid cutting element, plants such as grass in the working region and along the edge of the working region are better cut.

In an embodiment, the cut-to-edge module 200 is located on one side of the central axis. The "located on one side of the central axis" herein does not specifically indicate that the entire cut-to-edge module 200 is located on one side of the central axis, but instead the second rotational axis is located on one side of the central axis. The autonomous lawn mower includes a cut-to-edge mode. In the cut-to-edge mode, the control module receives a detection signal of the detection module, to obtain a location of the housing relative to the boundary of the working region. Based on this, the control module controls the autonomous lawn mower to move along the boundary of the working region to make the side on which the second rotational axis is located face the outside of the working region. In addition, the control module controls the cut-to-edge module to work to make the autonomous lawn mower perform cut-to-edge along the boundary of the working region.

In this embodiment, optionally, the cutting module 300 is located at the central axis or on a side of the central axis. In the cut-to-edge mode, optionally, the control module controls the cutting module 300 and the cut-to-edge module to work simultaneously, or the control module controls the cutting module not to work.

An embodiment of the present invention provides a control method of the foregoing autonomous lawn mower, including the following steps:

detecting a boundary of a working region; and determining whether a cut-to-edge-mode start condition is met, and if yes, controlling the cut-to-edge module 200 to work and controlling the movement module to move along the boundary of the working region to make one side on which the cut-to-edge module 200 is located face the outside of the working region.

Figure 18:
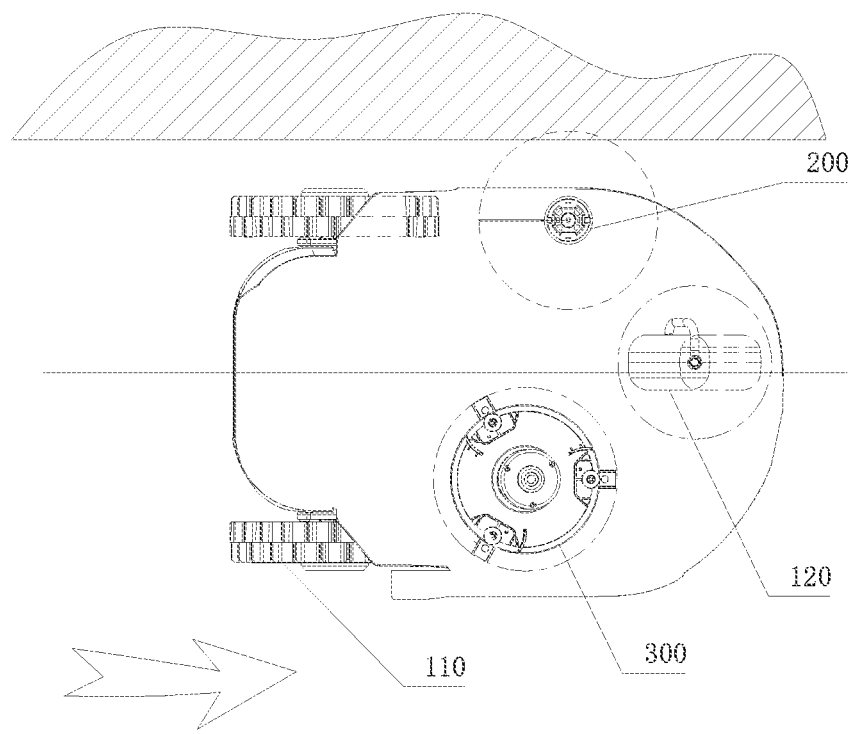
FIG. 18 is a partial enlarged view of the autonomous lawn mower shown in FIG. 17.

In an embodiment, the autonomous lawn mower includes a cut-along-edge mode and a cut-to-edge mode. In the cut-along-edge mode, the control module controls the cutting module 300 to work and controls the autonomous lawn mower to move along the boundary of the working region. In the cut-to-edge mode, the control module controls the cut-to-edge module 200 to work and controls the autonomous lawn mower to move along the boundary of the working region. Referring to FIG. 18, in this embodiment, the cut-to-edge module 200 is located on one side of the central axis. In the cut-to-edge mode, the control module controls the autonomous lawn mower to move along the boundary of the working region to make the side on which the cut-to-edge module 200 is located face the outside of the working region. That is, if the cut-to-edge module 200 is located on the left side of the central axis, in the cut-to-edge mode, the autonomous lawn mower moves in a clockwise direction along the boundary of the working region. If the cut-to-edge module 200 is located on the right side of the central axis, in the cut-to-edge mode, the autonomous lawn mower moves in a counterclockwise direction along the boundary of the working region.

In this embodiment, optionally, the cutting module 300 is located at the central axis or on a side of the central axis. If the cutting module 300 is located at the central axis, in the cut-along-edge mode, the control module controls the autonomous lawn mower to move in a clockwise direction or a counterclockwise direction along the boundary. If the cutting module 300 and the cut-to-edge module 200 are located on the same side, the control module controls the autonomous lawn mower to move along the boundary, the moving direction being the same as that in the cut-to-edge mode. If the cutting module 300 and the cut-to-edge module 200 are located on different sides, the control module controls the autonomous lawn mower to move along the boundary, the moving direction being opposite to that in the cut-to-edge mode.

An embodiment of the present invention provides a control method of the foregoing autonomous lawn mower, including the following steps:

determining whether a cut-along-edge mode start condition is met, and if yes, controlling the cutting module 300 to work and controlling the movement module to move along the boundary of the working region; and determining whether a cut-to-edge-mode start condition is met, and if yes, controlling the cut-to-edge module 200 to work and controlling the movement module to move along the boundary of the working region to make one side on which the cut-to-edge module 200 is located face the outside of the working region.

In an embodiment, the cut-along-edge mode start condition includes that the control module receives a cut-along-edge start signal, a working region cutting complete signal, a return signal or the like. The cut-to-edge-mode start condition includes that the control module receives a cut-along-edge complete signal, and further a cut-to-edge start signal, a working region cutting complete signal, a return signal or the like. It may be understood that, in this embodiment, the cut-along-edge work is completed before the cut-to-edge work starts, but this embodiment does not impose limitations on whether the cut-along-edge work and the cut-to-edge work are performed successively.

Referring to FIG. 18, in an embodiment, the cut-to-edge module 200 is located on one side of the central axis, and the cutting module 300 is located on the other side of the central axis. In the cut-along-edge mode, the control module controls the autonomous lawn mower to move along the boundary of the working region to make the other side on which the cutting module 300 is located face the outside of the working region. In the cut-along-edge mode, the control module controls the cutting module 300 to work, and the autonomous lawn mower moves along the boundary of the working region in a first direction to make the side on which the cutting module 300 is located face the outside of the working region, so that the cutting module 300 can implement cutting to the boundary of the working region as much as possible. In the cut-to-edge mode, the control module controls the cut-to-edge module 200 to work, and the autonomous lawn mower moves along the boundary of the working region in a second direction to make the side on which the cut-to-edge module 200 is located face the outside of the working region, so that the cut-to-edge module 200 can perform cutting to a region that the cutting module 300 cannot reach. In this embodiment, the control module controls the cut-along-edge mode to be started before the cut-to-edge mode. The cut-to-edge mode can be started only after the cut-along-edge mode is completed. Optionally, in the cut-to-edge mode, if a distance by which the autonomous lawn mower moves along the boundary of the working region or a time for which the autonomous lawn mower moves along the boundary of the working region meets a preset value, it is determined that the cut-along-edge mode is completed. Optionally, the control module may control the autonomous lawn mower to switch to the cut-to-edge mode as soon as the cut-along-edge mode is completed, to complete the cut-to-edge work of the autonomous lawn mower. The control module may alternatively control the autonomous lawn mower to switch to another mode after the cut-to-edge mode is completed and to switch to the cut-to-edge mode after a cut-to-edge-mode start signal is received.

An embodiment of the present invention provides a control method of the foregoing autonomous lawn mower, including the following steps:

determining whether a cut-along-edge mode start condition is met, and if yes, controlling the cutting module 300 to work and controlling the movement module to move along the boundary of the working region in a first direction to make the cutting module 300 face the outside of the working region.

determining whether a cut-to-edge-mode start condition is met, and if yes, controlling the cut-to-edge module 200 to work and controlling the movement module to move along the boundary of the working region to make one side on which the cut-to-edge module 200 is located face the outside of the working region. The direction is a second direction. Because the cutting module 300 and the cut-to-edge module 200 are respectively located on two sides of the central axis, the first direction and the second direction are opposite.

In another embodiment, referring to FIG. 5, optionally, if the cutting module 300 is located at the central axis, in the cut-along-edge mode, the control module may control the autonomous lawn mower to move along the boundary of the working region in a clockwise direction or in a counter-clockwise direction.

In an embodiment, a control method of the autonomous lawn mower includes the following steps:

detecting whether a cut-to-edge-mode start condition is met, and if yes, controlling the cutting module 300 and the cut-to-edge module 200 to work and controlling the movement module to move along the boundary of the working region to make the cut-to-edge module 200 face the outside of the working region. In this embodiment, when the movement module moves along the boundary of the working region, the cutting module 300 and the cut-to-edge module 200 works simultaneously. Optionally, the first rotational axis is located at the central axis.

An embodiment of the present invention provides a control method of the autonomous lawn mower, including the following steps:

starting a cut-along-edge mode, where in the cut-along-edge mode, the autonomous lawn mower moves along the boundary of the working region in a first direction, and the cut-to-edge module 200 and/or the cutting module 300 works; and optionally, the boundary of the working region may form a circle, a straight line, a curve, an irregular shape or another shape; and next, starting a cut-to-edge mode, where in the cut-to-edge mode, the autonomous lawn mower moves along the boundary of the working region in a second direction, the cutting module 300 and/or the cut-to-edge module 200 works; and the second direction is a direction opposite to the first direction, that is, the autonomous lawn mower moves along the boundary of the working region in an opposite direction.

That is, after the cut-along-edge mode is started, the autonomous lawn mower may move along the boundary of the working region in the first direction, the cut-to-edge module 200 trims plants, and the cutting module 300 stops working. Next, the cut-to-edge mode is started, and the autonomous lawn mower may move along the boundary of the working region in the second direction, the cutting module 300 cuts and trims plants, and the cut-to-edge module 200 stops working.

Alternatively, after the cut-along-edge mode is started, the autonomous lawn mower may move along the boundary of the working region in the first direction, the cutting module 300 cuts and trims plants, and the cut-to-edge module 200 stops working. Next, the cut-to-edge mode is started, and the autonomous lawn mower moves along the boundary of the working region in the second direction, the cut-to-edge module 200 trims plants, and the cutting module 300 stops working.

It may also be that after the cut-along-edge mode is started, the autonomous lawn mower may move along the boundary of the working region in the first direction, both the cut-to-edge module 200 and the cutting module 300 work to cut and trim plants. Next, the cut-to-edge mode is started, the autonomous lawn mower may move along the boundary of the working region in the second direction, and both the cut-to-edge module 200 and the cutting module 300 work to cut and trim plants.

An embodiment of the present invention provides a control method of the autonomous lawn mower, including the following steps:

starting a cut-to-edge mode, where in the cut-to-edge mode, the autonomous lawn mower moves along the boundary of the working region in a second direction, the cut-to-edge module 200 and/or the cutting module 300 works; and next, starting a cut-along-edge mode, where in the cut-along-edge mode, the autonomous lawn mower moves along the boundary of the working region in a first direction, the cutting module 200 and/or the cut-to-edge module 300 works; and the second direction is a direction opposite to the first direction, that is, the autonomous lawn mower moves along the boundary of the working region in an opposite direction.

Optionally, the boundary of the working region may form a circle, a straight line, a curve, an irregular shape or another shape.

Optionally, when the autonomous lawn mower moves along the boundary of the working region in the first direction, the autonomous lawn mower may cover the whole boundary or a part of the boundary of the working region or cover the boundary of the working region once or a plurality of times. For example, when the boundary of the working region is a circle, the autonomous lawn mower covers one whole circle, a semicircle or a plurality of circles in the first direction.

Optionally, when the autonomous lawn mower moves along the boundary of the working region in the second direction, the autonomous lawn mower may cover the whole boundary or a part of the boundary of the working region or cover the boundary of the working region once or a plurality of times. For example, when the boundary of the working region is a circle, the autonomous lawn mower covers one whole circle, a semicircle or a plurality of circles in the second direction.

Figure 15:
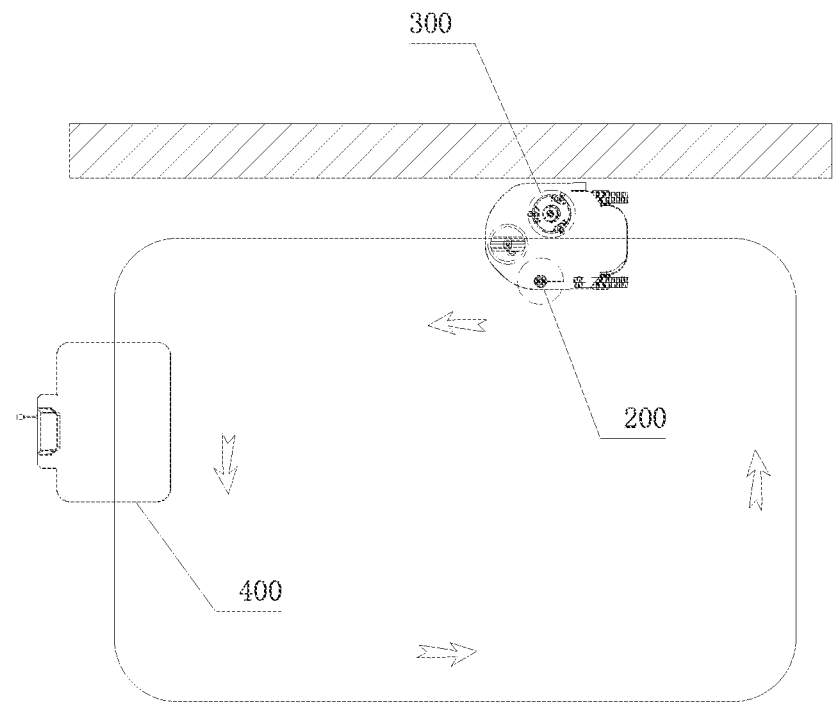
FIG. 15 is a working schematic diagram of an autonomous lawn mower according to an embodiment of the present invention.
Figure 16:
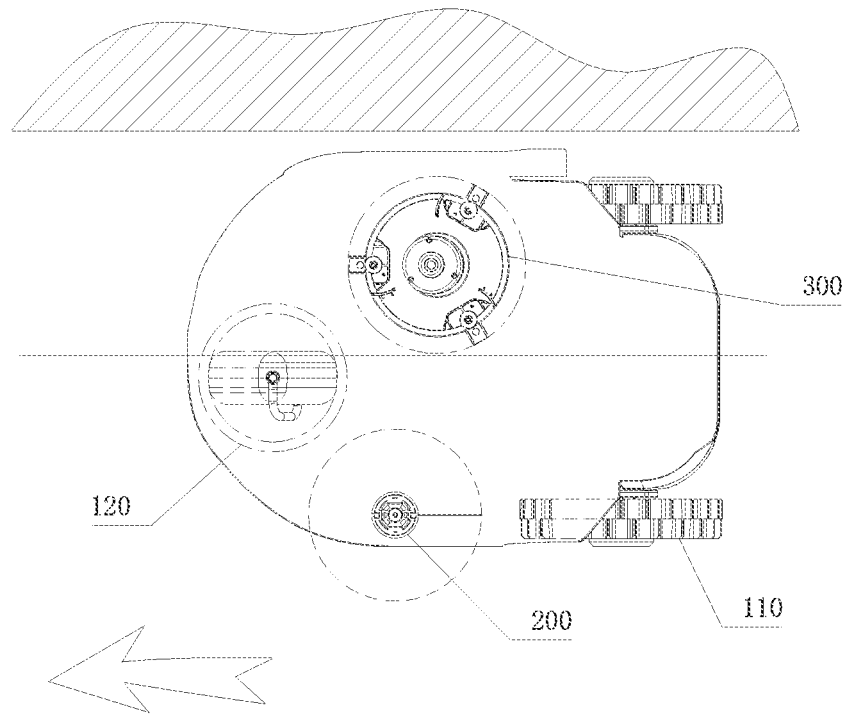
FIG. 16 is a partial enlarged view of the autonomous lawn mower shown in FIG. 15.

Referring to FIG. 15 to FIG. 18, in an optional implementation of this embodiment, in the cut-along-edge mode, the autonomous lawn mower moves along the boundary of the working region in the first direction, the cutting module 300 works, and the cut-to-edge module 200 stops working. As shown in FIG. 15 and FIG. 16, when the cutting module 300 works, the cutting module 300 cannot completely perform cutting to the edge.

Figure 17:
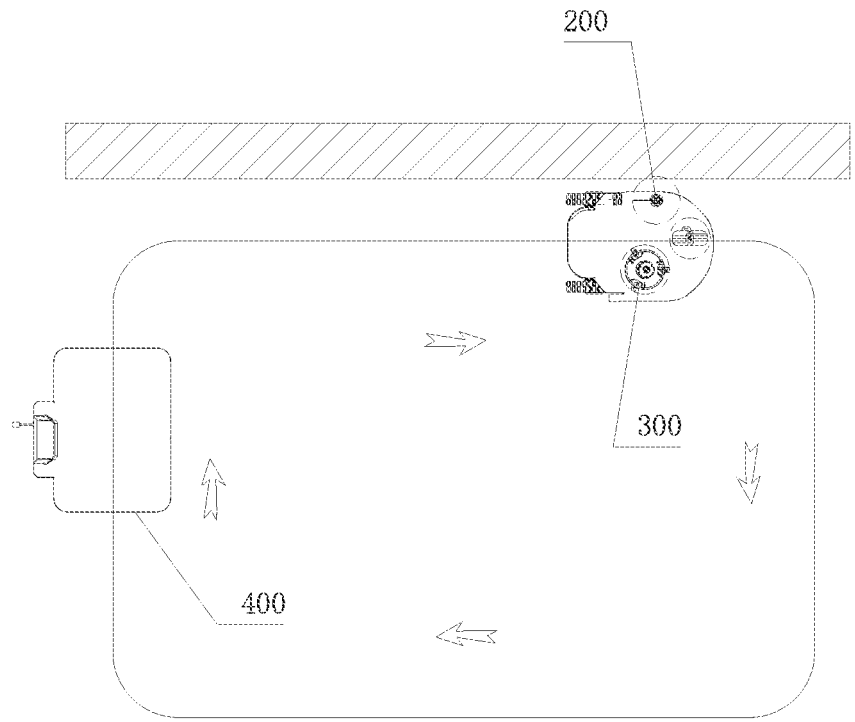
FIG. 17 is a working schematic diagram of an autonomous lawn mower according to an embodiment of the present invention.

Next, the cut-to-edge mode is started, the autonomous lawn mower moves along the boundary of the working region in the second direction, the cut-to-edge module 200 works and trims plants beyond the boundary of the working region, and the cutting module 300 stops working. As shown in FIG. 17 and FIG. 18, when the cut-to-edge module 200 works, the cut-to-edge module 200 can trim plants to the edge.

The cutting module 300 that includes the rigid cutting element works first and the cut-to-edge module 200 that includes the flexible trimming element 210 works later. Therefore, an actual cutting width of the flexible trimming element 210 is reduced to optimize the effect of edge cutting, and further the wear of the flexible trimming element 210 is reduced to make the flexible trimming element 210 more durable.

Figure 12:
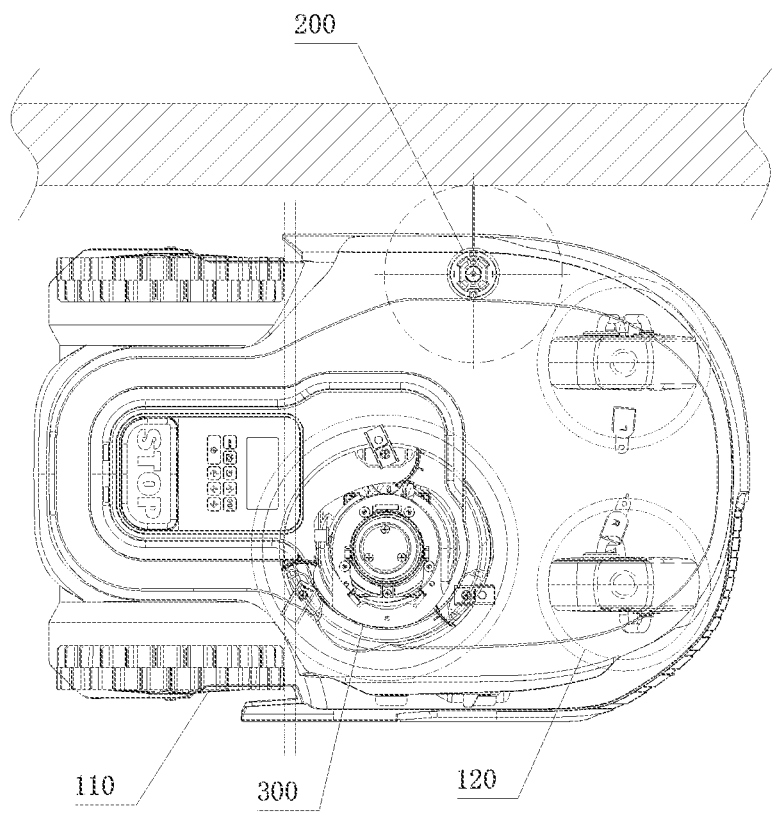
FIG. 12 is a working schematic diagram of an autonomous lawn mower according to an embodiment of the present invention.
Figure 13:
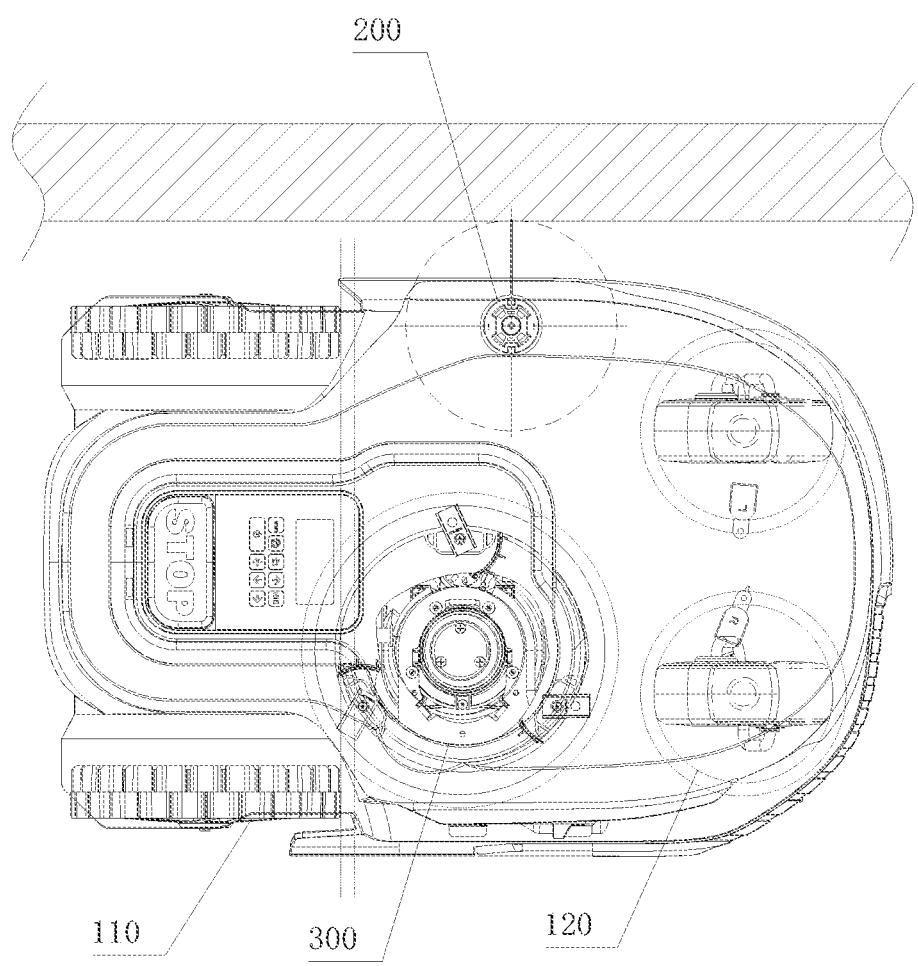
FIG. 13 is a working schematic diagram of an autonomous lawn mower according to an embodiment of the present invention.
Figure 14:
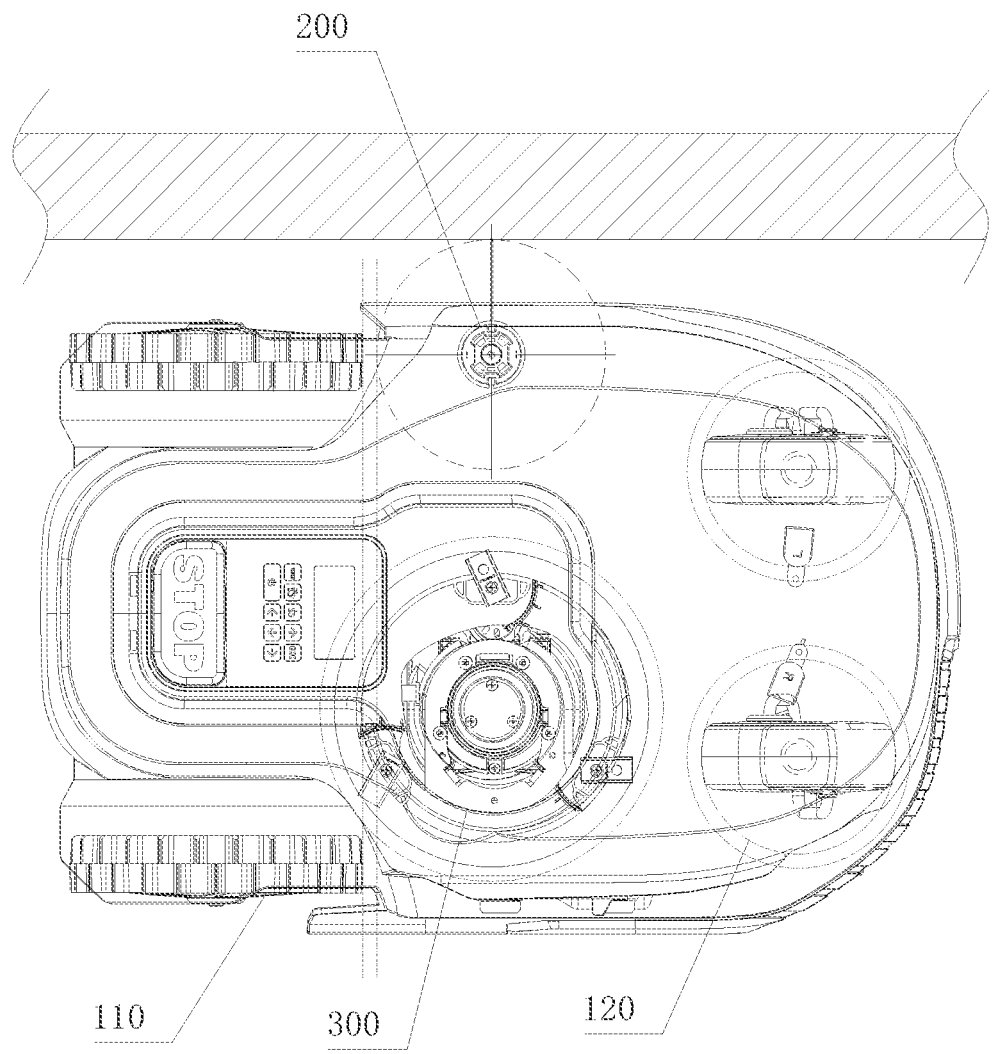
FIG. 14 is a working schematic diagram of an autonomous lawn mower according to an embodiment of the present invention.

For the position arrangement of the cut-to-edge module 200, this embodiment provides a group of examples that the autonomous lawn mower moves along a boundary of a working region that has a right-angle turn to cut plants such as grass at the edge of the working region. Referring to FIG. 12 to FIG. 14, the cut-to-edge modules 200 are respectively arranged at positions near the head, near the middle, and near the tail of the housing 100. The diameters of the cut-to-edge modules 200 are the same. Referring to FIG. 12, the cut-to-edge module 200 is arranged as much as possible on the front side of the housing 100, that is, the position near the head. Referring to FIG. 13, the cut-to-edge module 200 is arranged as much as possible in the middle of the housing 100, that is, the position near the middle. Referring to FIG. 14, the cut-to-edge module 200 is arranged as much as possible on the rear side of the housing 100, that is, the position near the tail.

Referring to FIG. 12 to FIG. 14, the cut-to-edge modules 200 are respectively arranged at different positions of the housing 100 with different uncut turning areas. The uncut area of the cut-to-edge module 200 near the head is smaller than the uncut area of the cut-to-edge module 200 near the middle. The uncut area of the cut-to-edge module 200 near the middle is smaller than the uncut area of the cut-to-edge module 200 near the tail. Therefore, the cut-to-edge module 200 is arranged on the front side of the housing 100 as much as possible, that is, a position near the head to achieve a relatively small uncut turning area during turning.

With reference to FIG. 15 and FIG. 17, the embodiments further provide a grass cutting system, including a power station 400 and the foregoing autonomous lawn mower.

The power station 400 is used for supplying power to the autonomous lawn mower. The power station 400 may supply power to the autonomous lawn mower in a wired or wireless manner.

The grass cutting system includes the foregoing autonomous lawn mower. The technical features of the autonomous lawn mower may also adapt to the grass cutting system. The disclosed technical features of the autonomous lawn mower are not described herein again. The grass cutting system has advantages of the autonomous lawn mower. The disclosed advantages of the autonomous lawn mower are not described herein again.

Finally, it should be noted that the foregoing embodiments are merely used for describing the technical solutions of the present invention, but are not intended to limit the present invention. Although the present invention is described in detail with reference to the foregoing embodiments, it should be appreciated by a person skilled in the art that, modifications may still be made to the technical solutions recorded in the foregoing embodiments, or equivalent replacements may be made to the part of all of the technical features; and these modifications or replacements will not cause the essence of corresponding technical solutions to depart from the scope of the technical solutions in the embodiments of the present invention.

What is claimed is:

1. An autonomous lawn mower comprising:
    a housing, comprising a central axis in a longitudinal direction;
    a movement module, mounted in the housing and configured to drive the housing to move;
    a cutting module, mounted in the housing and configured to rotate about a first rotational axis to form a cutting region, the cutting module comprising a cutting element;
    a cut-to-edge module, mounted in the housing and configured to rotate about a second rotational axis to form a cut-to-edge region, the cut-to-edge module comprising a cut-to-edge element, and the cut-to-edge element being different from the cutting element, wherein a projection of the cutting region at least partially overlaps with a projection of the cut-to-edge region; and
    a control module, electrically connected to the movement module, the cutting module, and the cut-to-edge module, and configured to control the autonomous lawn mower to move and work, wherein the first rotational axis and the second rotational axis are respectively located on two sides of the central axis.

2. The autonomous lawn mower according to claim 1, wherein a projection of the cut-to-edge region in a height direction at least partially protrudes from the housing.

3. The autonomous lawn mower according to claim 1, wherein a projection of the second rotational axis in a height direction is located in the housing.

4. The autonomous lawn mower according to claim 1, wherein a distance between the first rotational axis and the central axis is less than or equal to a distance between the second rotational axis and the central axis.

5. The autonomous lawn mower according to claim 1, wherein a distance between the first rotational axis and the central axis is a first distance, a distance between the second rotational axis and the central axis is a second distance, the first distance is less than the second distance, and a difference between the second distance and the first distance is less than or equal to a sum of a radius of the cutting region and a radius of the cut-to-edge region.

6. The autonomous lawn mower according to claim 1, wherein:
in a cut-along-edge mode, the control module is further configured to control the cutting module to work, and the movement module is further configured to move along a boundary of the working region in a first direction to make a side on which the first rotational axis is located to face towards an outside of the working region; and
in a cut-along-edge mode, the control module is further configured to control the cut-to-edge module to work, and the movement module is further configured to move along the boundary of the working region in a second direction to make a side on which the second rotational axis is located face to face towards the outside of the working region, the first direction being opposite to the second direction.

7. An autonomous lawn mower comprising:
a housing, comprising a central axis in a longitudinal direction;
a movement module, mounted in the housing and configured to drive the housing to move;
a cutting module, mounted in the housing and configured to rotate about a first rotational axis to form a cutting region;
a cut-to-edge module, mounted in the housing and configured to rotate about a second rotational axis to form a cut-to-edge region, the second rotational axis being located on one side of the central axis, wherein a projection of the cutting region at least partially overlaps with a projection of the cut-to-edge region, and a distance between the first rotational axis and the central axis is less than or equal to a distance between the second rotational axis and the central axis; and
a control module, electrically connected to the movement module, the cutting module, and the cut-to-edge module, and configured to control the autonomous lawn mower to move and work, wherein: when the autonomous lawn mower operates in a cut-to-edge mode, the control module is further configured to control the cut-to-edge module to work, and the movement module is further configured to move along a boundary of a working region to make a side of the second rotational axis to face towards an outside of the working region.

8. The autonomous lawn mower according to claim 7, wherein: when the autonomous lawn mower operates in a cut-along-edge mode, the control module is further configured to control the cutting module to work, and the movement module is further configured to move along the boundary.

9. The autonomous lawn mower according to claim 8, wherein: in the cut-along-edge mode, a direction in which the movement module moves along the boundary is opposite to a moving direction in the cut-to-edge mode.

10. The autonomous lawn mower according to claim 8, wherein when the cut-along-edge mode is completed, the control module is further configured to start the cut-to-edge mode.

11. The autonomous lawn mower according to claim 7, wherein the autonomous lawn mower comprises a detection module configured to detect the boundary of the working region, and the control module is further configured to control, based on the boundary detected by the detection module, the movement module to move along the boundary.

12. The autonomous lawn mower according to claim 7, wherein a distance between the first rotational axis and the central axis is a first distance, a distance between the second rotational axis and the central axis is a second distance, the first distance is less than the second distance, and a difference between the second distance and the first distance is less than or equal to a sum of a radius of the cutting region and a radius of the cut-to-edge region.

13. A control method comprising:
determining whether a cut-to-edge-mode start condition is met; and
in response to determining that the cut-to-edge-mode start condition is met, controlling a cut-to-edge module disposed on a front side of an autonomous lawn mower to work in a working region, and controlling the autonomous lawn mower to move along a boundary of the working region to make the front side of the autonomous lawn mower on which the cut-to-edge module is disposed to face towards an outside of the working region in a cut-to-edge mode, wherein a cutting module is located on another side of a central axis of the autonomous lawn mower in a longitudinal direction, and the control method further comprises:
determining whether a cut-along-edge mode start condition is met; and
in response to determining that the cut-along-edge mode start condition is met, controlling the autonomous lawn mower to move along the boundary to make the another side to face the outside of the working region in a cut-along-edge mode.

14. The control method according to claim 13, further comprising:
detecting the boundary of the working region; and
controlling, based on a detection of the boundary, the autonomous lawn mower to move along the boundary.

15. The control method according to claim 13, further comprising:
determining whether a cut-along-edge mode start condition is met; and
in response to determining that the cut-along-edge mode start condition is met, controlling a cutting module of the autonomous lawn mower to work, and controlling the autonomous lawn mower to move along the boundary of the working region.

16. The control method according to claim 13, wherein:
the cut-to-edge-mode start condition comprises a condition that a cut-along-edge work is completed, and
controlling the cut-to-edge module to work in the working region, and controlling the autonomous lawn mower to move along the boundary of the working region to make the front side of the autonomous lawn mower on which the cut-to-edge module is disposed to face towards the outside of the working region, comprises:

controlling the cut-to-edge module to work in the working region after the cutting module completes the cut-along-edge work.

17. The control method according to claim 13, wherein a direction in which a movement module moves along the boundary of the working region in the cut-along-edge mode is opposite to a moving direction in the cut-to-edge mode.

18. The autonomous lawn mower according to claim 7, wherein the projection of the cutting region at least partially overlapping with the projection of the cut-to-edge region comprising at least one of:

the projection of the cutting region and the projection of the cut-to-edge region having an overlapping part in a height direction of the housing; or the projection of the cutting region and the projection of the cut-to-edge region that are in the height direction of the housing being arranged at intervals, and the projection of the cutting region and the projection of the cut-to-edge region having an overlapping part in a transverse direction of the housing.

\* \* \* \* \*